US007742934B2

(12) United States Patent
Offutt, Jr. et al.

(10) Patent No.: US 7,742,934 B2
(45) Date of Patent: Jun. 22, 2010

(54) METHODS AND APPARATUS FOR DETERMINING NON-OBVIOUS SAVINGS IN THE PURCHASE OF GOODS AND SERVICES

(75) Inventors: Joseph Robert Offutt, Jr., Grapevine, TX (US); Jerome Edward Cash, Carrollton, TX (US)

(73) Assignee: Travelocity.com LP, Southlake, TX (US)

( * ) Notice: Subject to any disclaimer, the term of this patent is extended or adjusted under 35 U.S.C. 154(b) by 909 days.

(21) Appl. No.: 09/275,887

(22) Filed: Mar. 25, 1999

(65) Prior Publication Data

US 2002/0184059 A1   Dec. 5, 2002

(51) Int. Cl.
*G06Q 40/00* (2006.01)
(52) U.S. Cl. .......................................... 705/4
(58) Field of Classification Search .................. 705/1–6; 707/6
See application file for complete search history.

(56) References Cited

U.S. PATENT DOCUMENTS

| 4,862,357 | A | * | 8/1989 | Ahlstrom et al. ................. 705/6 |
| 4,879,648 | A | * | 11/1989 | Cochran et al. ............. 345/841 |
| 5,021,953 | A | * | 6/1991 | Webber et al. ................. 705/6 |
| 5,191,523 | A | * | 3/1993 | Whitesage ...................... 705/6 |
| 5,237,499 | A | * | 8/1993 | Garback ........................ 705/5 |
| 5,331,546 | A | * | 7/1994 | Webber et al. ................. 705/6 |
| 5,732,398 | A | * | 3/1998 | Tagawa .......................... 705/5 |
| 5,794,207 | A |   | 8/1998 | Walker et al. |
| 5,832,454 | A | * | 11/1998 | Jafri et al. ....................... 705/5 |
| 5,897,620 | A | * | 4/1999 | Walker et al. .................... 705/5 |
| 5,948,040 | A | * | 9/1999 | DeLorme et al. ............ 701/201 |
| 6,360,205 | B1 |   | 3/2002 | Iyengar et al. |

OTHER PUBLICATIONS

Basile, Abbie. "Expedia Travel Agent/Yahoo! Airlines," Library Journal. Jul. 1998. p. 36.*
Hansell, Saul. "As Patents Multiply, Web Sites Find Lawsuits Are A Click Away," New York Times, Dec. 11, 1999. p. A1.*
"Sabre Group: Travelocity to Offer Vacation and Cruise Information," M2 Presswire. Dec. 15, 1997. p. 1.*
Smith, Michael. "One-Stop Shopping," Canadian Banker. Sep./Oct. 1998. p. 42.*
Michael Smith, One-Stop Shopping, Sep./Oct. 1998 p. 42, Canadian Banker, vol. 105, Iss. 5.*
Tom Parsons; *Insider Travel Secrets*, 1996, 1997; 4 pages; Best Fares USA, Inc.; Library of Congress Catalog Card No. 96-83477.

* cited by examiner

*Primary Examiner*—Robert W Morgan
(74) *Attorney, Agent, or Firm*—Alston & Bird LLP

(57) ABSTRACT

Systems consistent with the present invention implement provide information regarding savings associated travel alternatives. Such systems receive requests from users reflecting travel itineraries, respectively. Each itinerary is analyzed to determine a set of alternative itineraries comparable to the travel itinerary specified in the request based on selected rules associated with travel. Then a value or cost of the input travel itinerary is determined and a value for each of the alternative itineraries is also calculated. The systems then generate a report reflecting the input travel itinerary specified in the request, each of the alternative itineraries, the value for each travel itinerary, and a difference between the value for the travel itinerary specified in the request and each of the alternative itineraries.

45 Claims, 7 Drawing Sheets

METHODS AND APPARATUS FOR DETERMINING NON-OBVIOUS SAVINGS IN THE PURCHASE OF GOODS AND SERVICES

BACKGROUND OF THE INVENTION

A. Field of the Invention

This invention relates to electronic commerce and, more particularly, to an apparatus and methods for determining non-obvious savings in the purchase of goods and services.

B. Description of the Related Art

The Internet has been hailed the marketplace of the future, a result of its accessibility and usability. A computer equipped with a communication mechanism such as a modem and telephone connection is nearly all that is necessary to gain access to the Internet. A program called a browser, such as the Netscape Navigator from Netscape Corporation, makes it a simple task to traverse the vast network of information available on the Internet and, specifically, its subpart known as the "World Wide Web."

The architecture of the Web follows a conventional client-server model. The terms "client" and "server" are used to refer to a computer's general role as a requester of data (the client) or provider of data (the server). Under the Web environment, Web browsers reside in clients and specially formatted "Web documents" reside on Internet (Web) servers. Web clients and Web servers communicate using a protocol called "HyperText Transfer Protocol" (HTTP).

In operation, a browser opens a connection to a server and initiates a request for a document. The server delivers the requested document, typically in the form coded in a standard "HyperText Markup Language" (HTML) format. After the document is delivered, the connection is closed. The browser displays the document or performs a function designated by the document.

Every day, more people gain access to the Web, and every day, more of them are shopping online. Online shopping provides a level of convenience they want, need and will soon demand. Electronic commerce or "e-commerce" is the term often used to refer, at least in part, to online shopping on the Web. E-commerce is a unique opportunity for businesses of any size. E-commerce can expand a company's marketplace- and consequently, its customer database. By simply providing a Web server having information on the company's product offerings and the customer database, and linking the Web server to the Web, the company can track visits, sales, buying trends and product preferences-all at the customer level. The company can then present its customers with products they are most likely to buy-on an individual basis. For this reason alone most marketing professionals consider the Web to be one of the best direct marketing tools.

But the number of retailers with online stores is growing exponentially every year, making it increasingly difficult for online shoppers to navigate the Web to locate particular products at the best prices. At one site, called the "Internet Mall," online shoppers can browse through more than 20,000 "virtual stores." This challenge for consumers also introduces a problem for merchants in designing campaigns to attract consumers to the merchants' Web sites and away from their competitors' sites.

Certain known business methods, and conventional implementations of those methods, give consumers greater control over a business deal by permitting consumers to set the price they are willing to pay for selected products and/or services, such as travel resources like airfare, car rentals, and similar travel commodities. Such methods and implementations, however, do not necessarily provide consumers with the best available price for the products and/or services, and consequently, they do not permit the merchants to claim that they deliver the best available price for a particular product or service. Consequently, consumers may still be paying too much for products and services using these implementations.

There is therefore a need for a system that can attract more consumers to a Web server by delivering on a claim that the merchant offers the best available price for a particular product or service. Such a system not only permits the server to expose more consumers to its products and services but also it permits the server to expose an increasing number of consumers to information such a advertisements for products and services.

SUMMARY OF THE INVENTION

Methods, systems, and articles of manufacture consistent with the present invention overcome the shortcomings of existing systems by enabling consumers to obtain information on savings associated with travel alternatives. Such methods, systems, and article of manufacture receive requests from users reflecting travel itineraries, respectively. Each itinerary is analyzed to determine a set of alternative itineraries comparable to the travel itinerary specified in the request based on selected rules associated with travel. Then a value or cost of the input travel itinerary is determined and a value for each of the alternative itineraries is also calculated. The methods, systems, and article of manufacture consistent with the present invention then generate a report reflecting the input travel itinerary specified in the request, each of the alternative itineraries, the value for each travel itinerary, and a difference between the value for the travel itinerary specified in the request and each of the alternative itineraries.

Such methods, systems, and article of manufacture may also assign geographical coordinates for each of the originating location and the destination in the requested itinerary and generate a set of locations with coordinates located within a predetermined range of the destination based on information from a geographical coordinates database. This operation may also include reducing the range when a number of locations in the set exceeds a predetermined number or increasing the range when a number of locations in the set is smaller than a predetermined number.

In accordance with another aspect of the present invention, the user's request may be for any product or service, and a method, system, or article of manufacture enables users to discover non-obvious savings associated with alternatives for the requested product or service.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1:
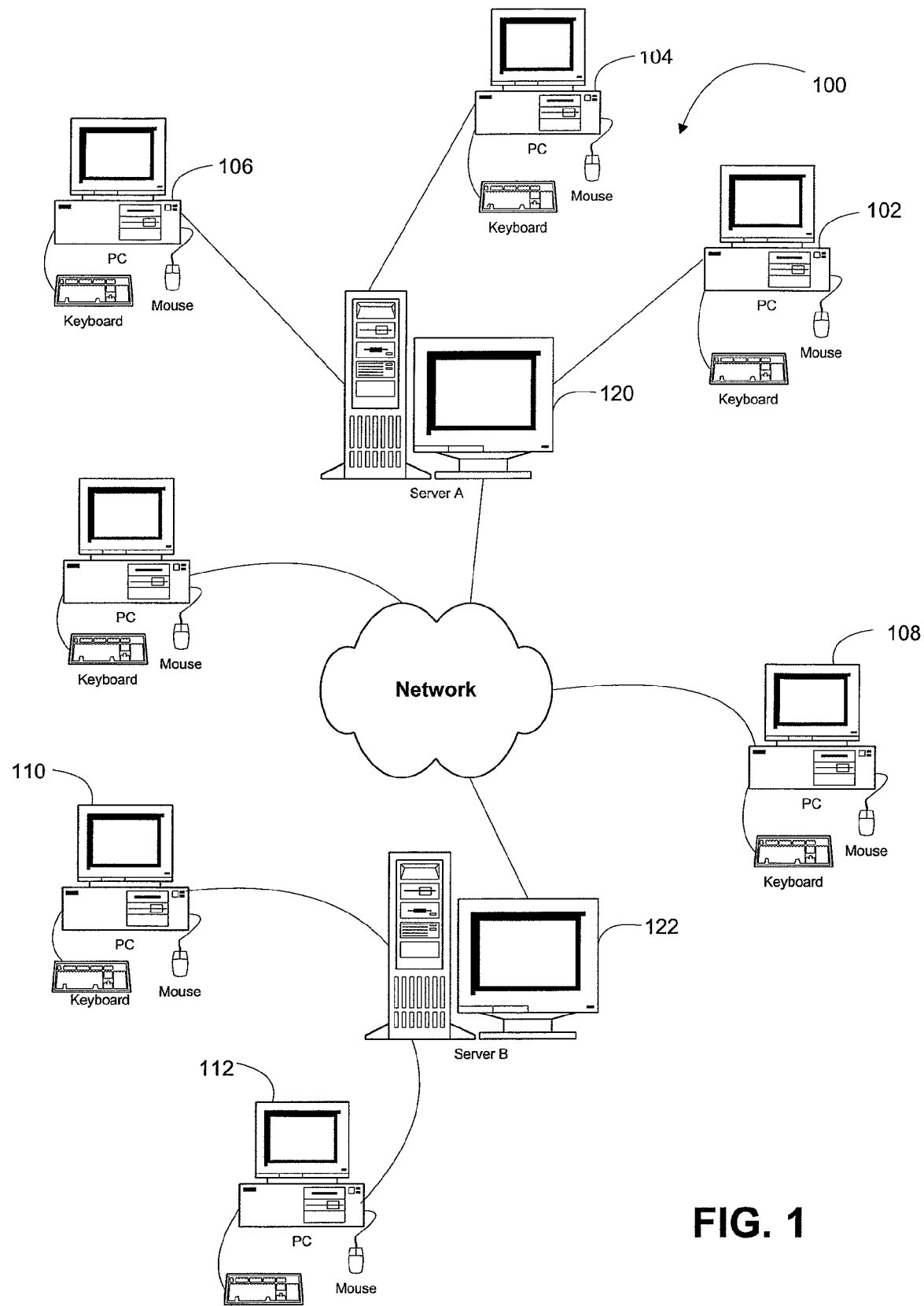
FIG. 1 is a pictorial diagram of a computer network in which systems consistent with the present invention may be implemented.

Reference will now be made in detail to an implementation consistent with the present invention as illustrated in the accompanying drawings. Wherever possible, the same reference numbers will be used throughout the drawings and the following description to refer to the same or like parts.

Introduction

Systems consistent with the present invention enable consumers to locate non-obvious savings in the purchase price of goods and services. Obvious savings are those that are known to most if not all buyers of a particular product or service. For example, in the case of travel, obvious savings include the price effects of advance purchase, alternative origin and departure times, meeting minimum stay requirements, and choosing air carriers commonly known for low prices (though the infrequent traveler may be unaware of many of these "obvious" savings). Non-obvious savings are those known only by a relative few who have accumulated knowledge in the detailed pricing practices of goods and services, are knowledgeable about non-obvious suppliers such as consolidators/wholesalers, and are willing to search for these savings. For example, in the case of travel, a "seasoned" traveler or travel agent accumulates knowledge about the price effects of alternative origin/destination, alternative air routing/ticketing configurations, travel packages, and alternative lodging or other itinerary components. Even with this knowledge, there is still the time and energy which must be expended to find the non-obvious savings.

Systems consistent with the present invention permit a buyer, seasoned or occasional, to systematically discover and take advantage of non-obvious savings just as if he or she had the services of a seasoned buyer or buyer agent by his side. Systems consistent with the present invention are pre-programmed with non-obvious pricing knowledge and automatically apply this knowledge to search for non-obvious savings. Such systems conduct this search by performing non-obvious re-configurations of goods and services and/or checking the prices of non-obvious suppliers of pre-packaged goods and services. They go a step further than even the seasoned buyer or buyer agent by requesting just-in-time "best offer" price quotes from suppliers, thereby creating a type of online, last-minute auction. In the case of travel, for example, a non-obvious product re-configuration would include: 1) alternative flight origin or destination cities; 2) alternative lodging accommodations; and 3) splitting a connecting flight itinerary into two tickets. Also in the case of travel, non-obvious suppliers would include: 1) travel consolidators/wholesalers; and 2) pre-packaged tours. In one implementation, a network accessible system such as the Internet, client/server, personal digital assistant (P.A.), or voice telephony, can be used for consumers, to access and retrieve information in a manner consistent with the present invention.

The systems consistent with the present invention can be pre-programmed with a variety of savings discovery "rules-of-thumb." For example, in shopping for travel, the rules of thumb might be to check alternate origin/destination airports, alternate times of day, alternate lodging. The systems may also contain fundamental geographic and proximity-based search capabilities for situations where price is influenced by location. They may be able to automatically relax search constraints based upon a buyer's priorities. For example, in the case of lodging, a free continental breakfast may be a lower priority requirement than having an indoor swimming pool. Consequently, they offer the uninformed, occasional buyer the same savings discovery power as the seasoned buyer or buyer agent.

Network Architecture

FIG. 1 illustrates a conceptual diagram of a computer network 100, such as the Internet. Computer network 100 comprises small computers (such as computers 102, 104, 106, 108, 110 and 112) and large computers (such as servers 120 and 122). In general, small computers are "personal computers" or workstations and are the sites at which a human user operates the computer to make requests for data from other computers or servers on the network. Usually, the requested data resides in large computers. In this scenario, small computers are clients and the large computers are servers.

In this specification, the terms "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client to server, or vice versa.

A client, such as computer 102, may request a file from server A 120. Since computer 102 is directly connected to server A 120, for example, through a local area network, this request would not normally result in a transfer of data over what is shown as "network" of FIG. 1. The "network" of FIG. 1 represents, for example, the Internet, which is an interconnection of networks. A different request from computer 102 may be for a file that resides in server B 122. In this case, the data is transferred from server B 122 through the network to server A 120 and, finally, to computer 102. The distance between server A 120 and server B 122 may be very long, e.g. across continents, or very short, e.g., within the same city. Further, in traversing the network the data may be transferred through several intermediate servers and many routing devices, such as bridges and routers.

Figure 2:
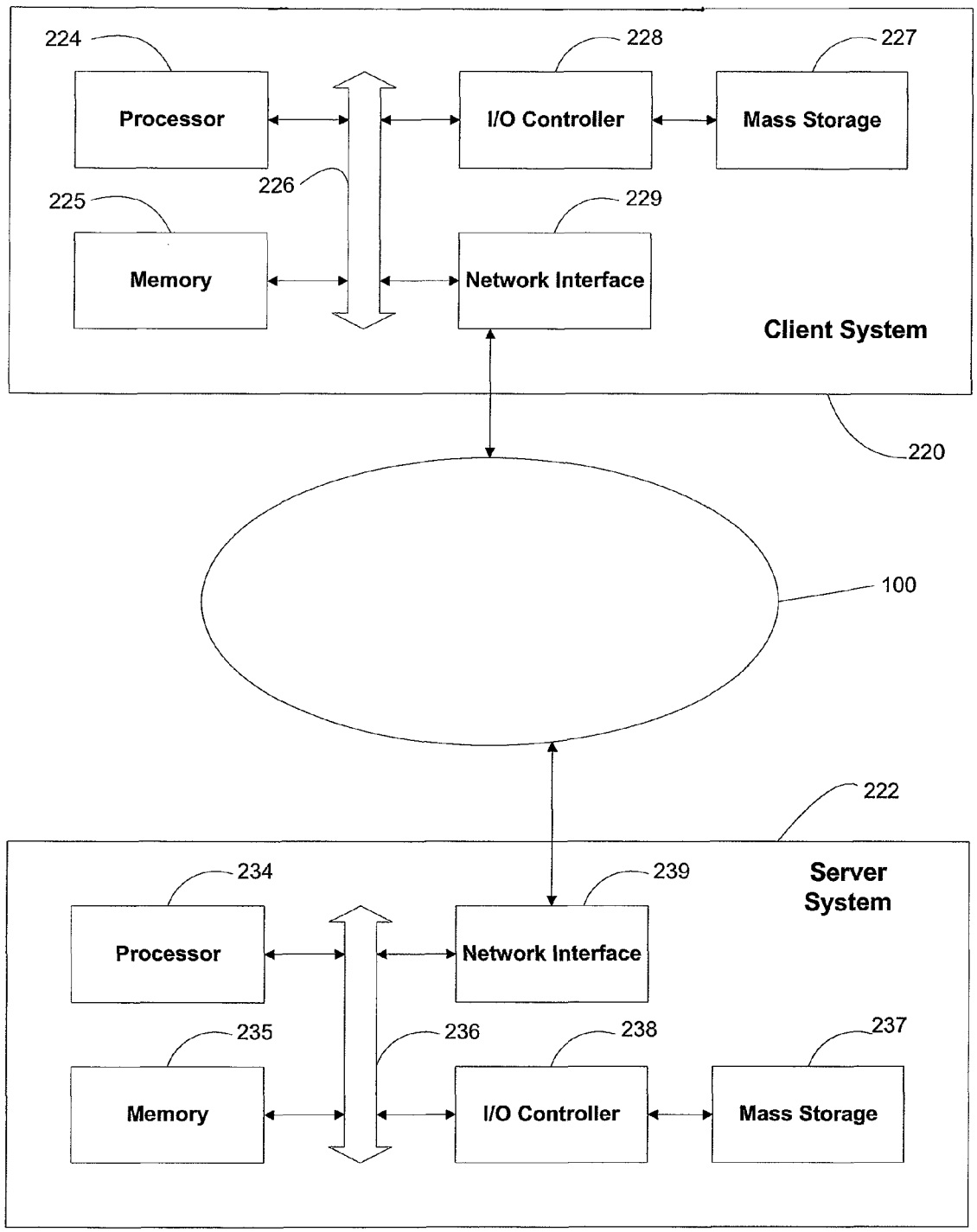
FIG. 2 shows a computer network containing a client system and a server system.

FIG. 2 shows, in more detail, an example of a client-server system interconnected through network 100. In this example, a remote server system 222 is interconnected through network 100 to client system 220. Client system 220 includes conventional components such as a processor 224, memory 225 (e.g. RAM), a bus 226 which couples processor 224 and memory 225, a mass storage device 227 (e.g. a magnetic hard disk or an optical storage disk) coupled to processor 224 and memory 225 through an I/O controller 228 and a network interface 229, such as a conventional modem.

Server system 222 also includes conventional components such as a processor 234, memory 235 (e.g. RAM), a bus 236 which couples processor 234 and memory 235, a mass storage device 237 (e.g. a magnetic or optical disk) coupled to processor 234 and memory 235 through an I/O controller 238 and a network interface 239, such as a conventional modem. It will be appreciated from the description below that the present invention may be implemented in software which is stored as executable instructions on a computer readable medium on the client and server systems, such as mass storage devices 227 and 237 respectively, or in memories 225 and 235 respectively.

Distributed Document Retrieval

The Internet consists of a worldwide computer network that communicates using well defined protocol known as the Internet Protocol (IP). Computer systems that are directly connected to the Internet each have an unique address consisting of four numbers separated by periods such as "192.101.0.3". To simplify Internet addressing, a "Domain Name System" was created that allows users to access Internet resources with a simpler alphanumeric naming system. For example, the name "travelocity. com" is the name for a computer operated by The SABRE Group, Inc.

To further define the addresses of resources on the Internet, a Uniform Resource Locator system was created that uses a Uniform Resource Locator (URL) as a descriptor that specifically defines a type of Internet resource and its location. URLs have the following format: "resource-type:Hdomain. address/path-name." The "resource-type" defines the type of Internet resource. Web documents, for example, are identified by the resource type "http", which indicates the protocol used to access the document.

To access a document on the Web, the user enters a URL for the Web document into a browser program executing on a client system with a connection to the Internet. The Web browser then sends a request in accordance with the HTTP protocol to the Web server that has the Web document using the URL. The Web server responds to the request by transmitting the requested object to the client. In most cases, the object is a plain text document containing text (in ASCII) that is written in HTML. Such objects often contain hyperlinks to other Web documents. The Web browser displays the HTML document on the screen for the user and the hyperlinks to other Web documents are emphasized in some fashion such that the user can selected the hyperlink.

Figure 3:
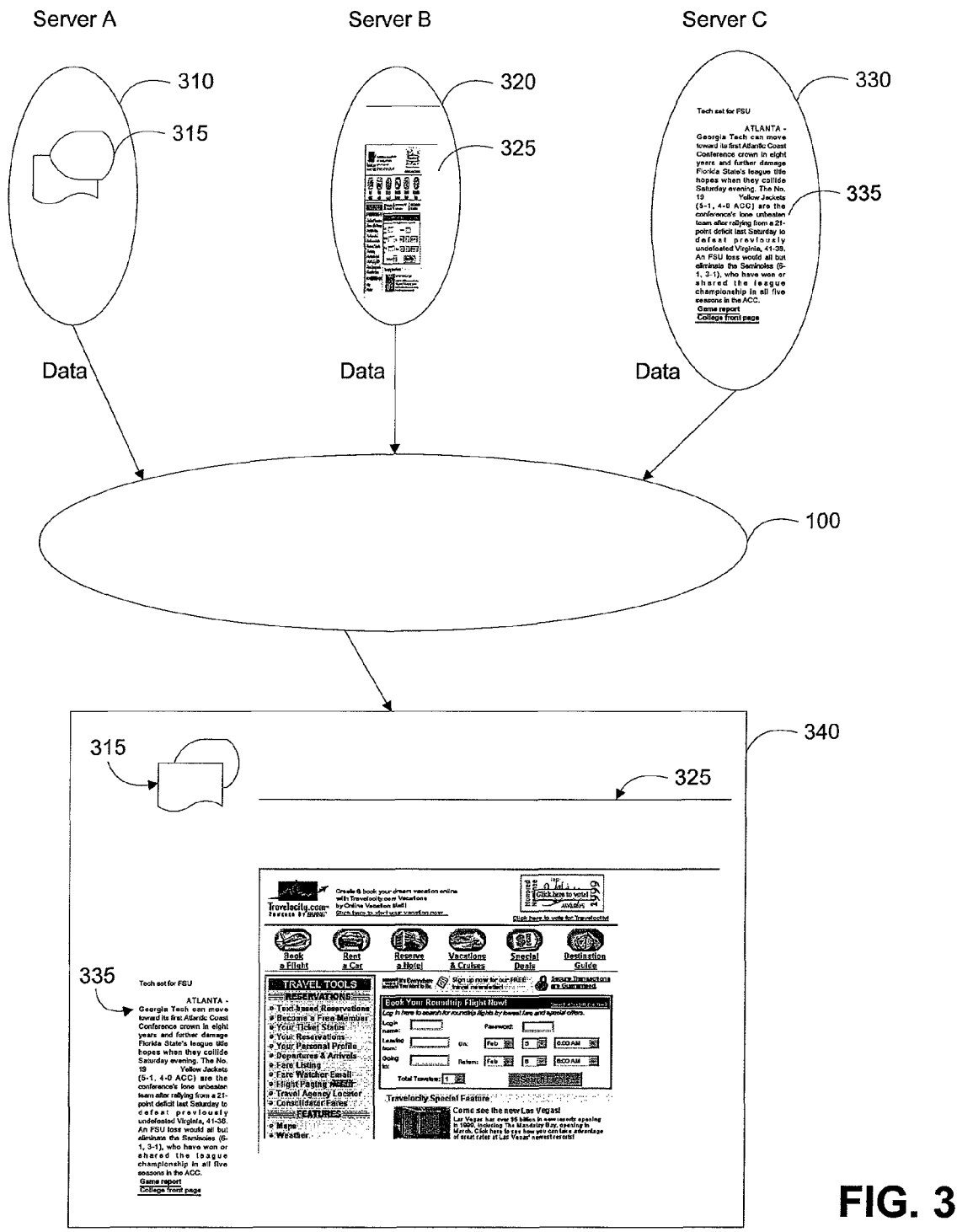
FIG. 3 illustrates the retrieval of remote image and text and their integration in a document.

In some instances, the HTML document may contain data from more than one server. For example, FIG. 3 illustrates the retrieval of remote text and images and their integration in a Web document by a client system 340. In FIG. 3, server A 310 contains an image 315, server B 320 contains a combination of text and image data 325 and server C 330 contains text data 335. Each of these servers is remotely located from the other servers and client 340. The transfer of data is via network 100. It should be appreciated that the text and image files could be located in the same server which is remote from client 340.

Different techniques are available to display these types of composite Web documents. For example, a program called a servlet executing on one of the servers may combine data from the various servers referenced in a selected Web document and transmit the composite Web document to the client. In other configurations, the client may utilize a program called an applet, which may be transmitted to the client from one of the servers, to access the multiple servers offering parts of the composite and to build the composite Web document.

System Architecture and Operation

Figure 4:
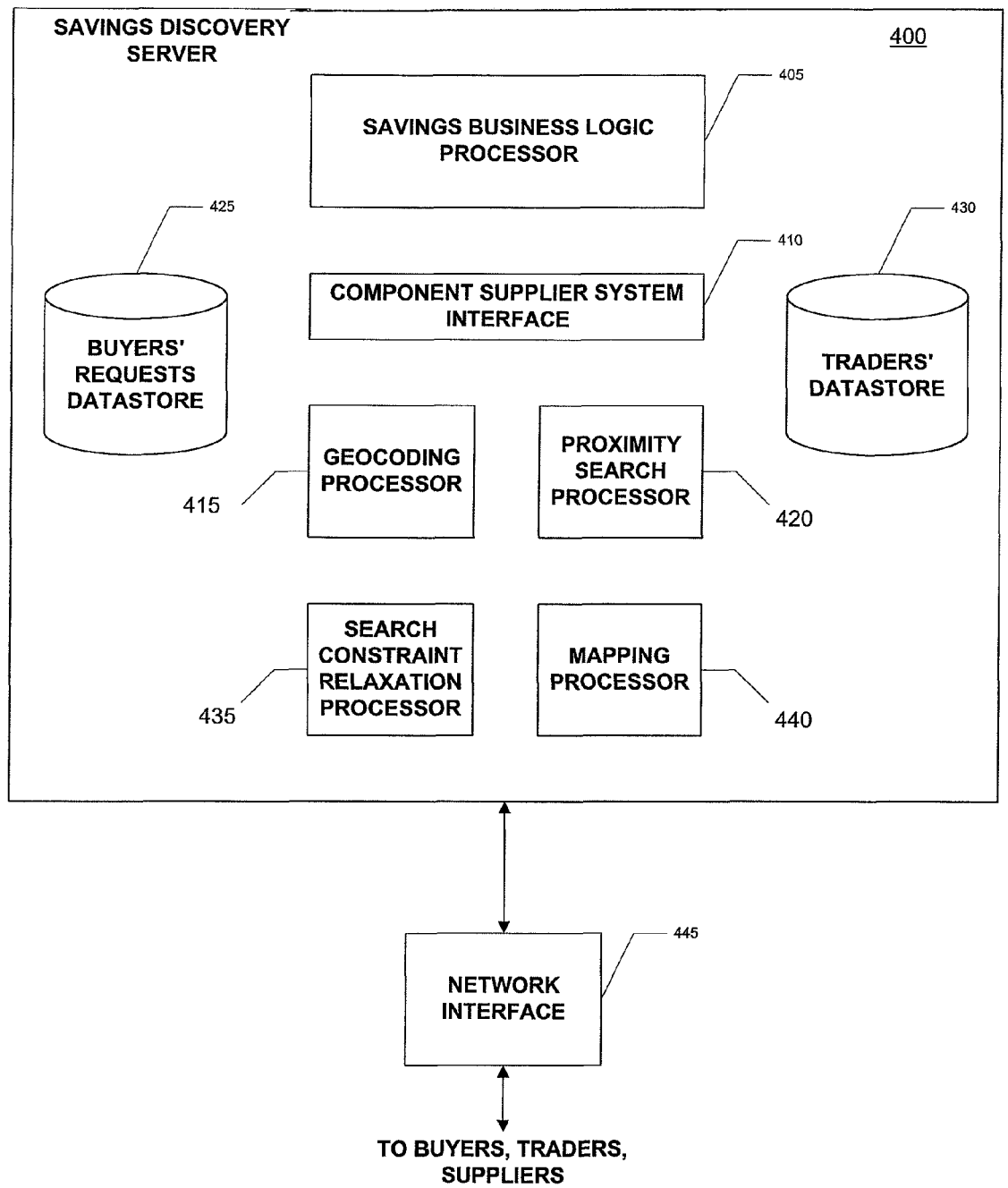
FIG. 4 is a block diagram of the architecture of a savings discovery server in a manner consistent with the principle of the present invention.

Systems consistent with the present invention employ a savings discovery server, for example, the server 400 shown in FIG. 4. Server 400 is connected to a network interface 445 that facilitates communication with buyers, traders, and suppliers on the Internet. Server 400 includes a number of components, savings business logic processor 405, component supplier system interface 410, geocoding processor 415, proximity search processor 420, buyers' requests datastore 425 and traders' datastore 430, search constraint relaxation processor 435, and mapping processor 440. The operation of each of these components will be explained below with reference to FIGS. 5 and 6.

Figure 5:
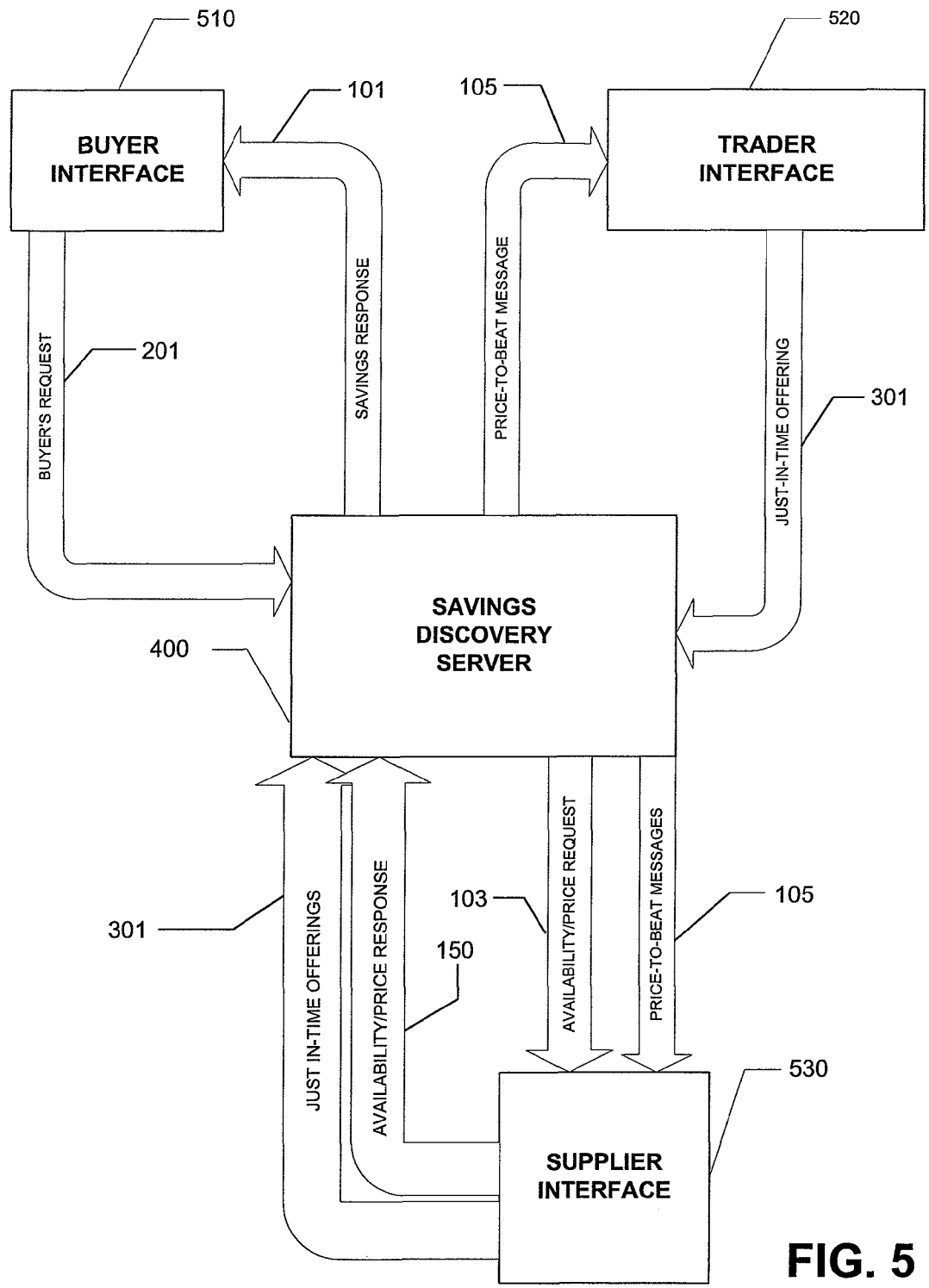
FIG. 5 illustrates a savings discovery server and its relationship to other computers in a manner consistent with the principle of the present invention.

FIG. 5 shows a savings discovery server 400 and machines distributed in the network having facilities such as interfaces for a buyer, trader, and supplier to communicate with server 400. FIG. 5 illustrates an example of this configuration with buyer interface 510, trader interface 520, and supplier interface 530 communicably connected to savings discovery server 400. Suppliers provide information on available inventory, such as seats available on scheduled flights, rooms available in hotels, cars available at airports for rental, and similar travel resources. Traders, on the other hand, are "consolidators" of travel resources that either buy the resources from suppliers in bulk at discount prices for resale or package various resources to resale. In many instances, traders may have the best available price for travel resources, even better than the price offered by a supplier for the same resource. Although the figure shows only one trader interface and only one supplier interface, the principles of the present invention contemplate many such interfaces.

In operation, server 400 receives requests from buyers for travel resources; receives price and availability information from various suppliers and traders; sends just-in-time "price-to-beat" messages to the suppliers and traders asking for their last minute best offer; and automatically re-configures and re-prices alternative configurations of the original product request and presents the information to the buyers. Underlying capabilities include geographic data encoding (geocoding), geographic/proximity-based searching, mapping, and search constraint relaxation.

Buyer interface 510 allows each buyer to input product and service requirements such as preferred locations, dates, components, and prices to beat. A buyers' requests datastore 425 persistently stores buyers' requests for subsequent access/marketing analysis.

Trader interface 520 and supplier interface 530 allow product and service traders and suppliers to input, configure, target, and maintain products, including prepackaged products and services in a traders' datastore 430. This datastore contains pre-packaged offerings of products and services that have been pre-configured and pre-negotiated by traders such as consolidators and wholesalers.

Receipt of buyer's request 201 by savings discovery server 400 triggers savings business logic processor 405 into action to serve as the main process control, apply the pre-programmed non-obvious savings knowledge, and orchestrate the search for non-obvious savings. Savings response 101 is transmitted back to buyer interface 510 via network interface 445.

Figure 6:
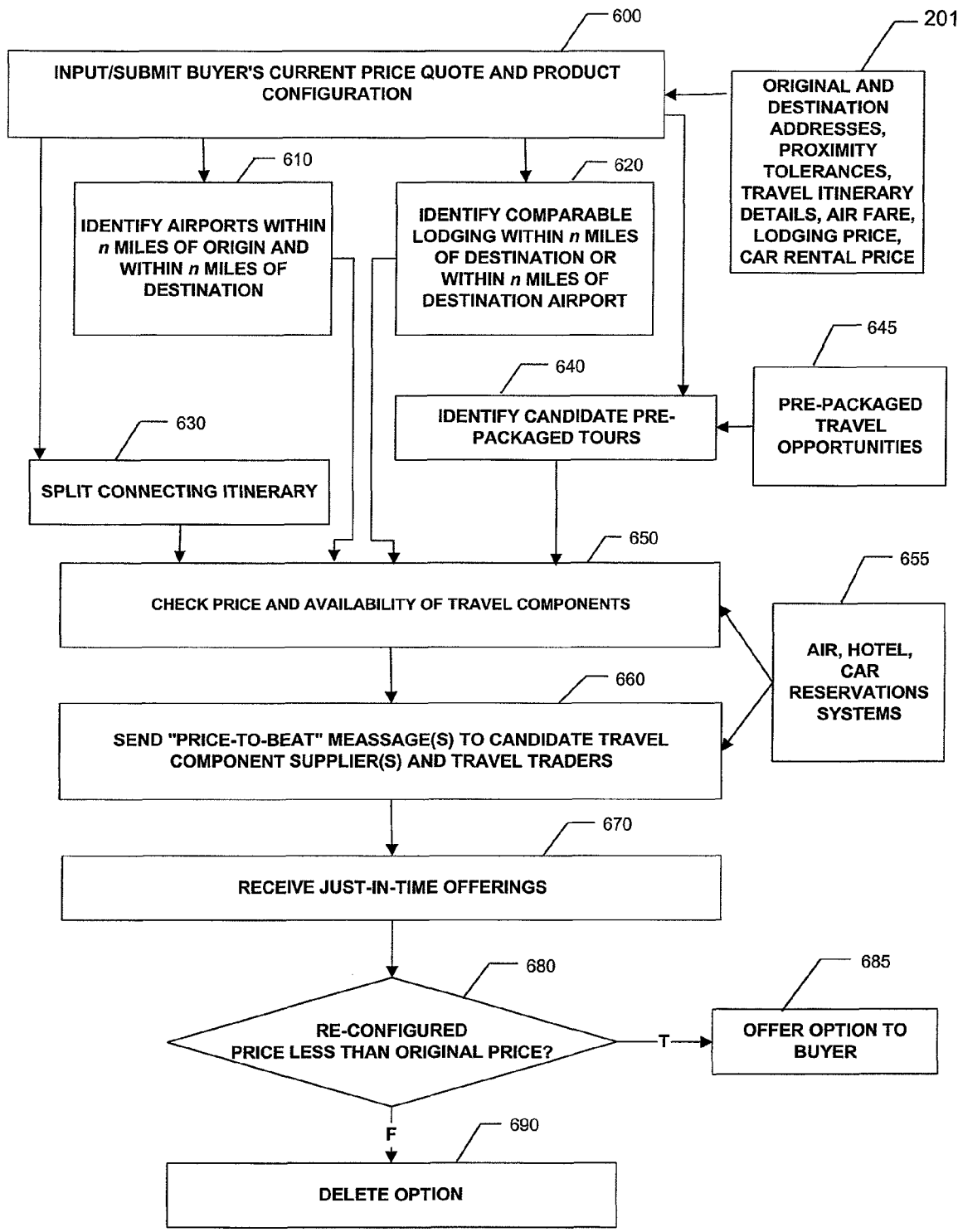
FIG. 6 is a flow chart of the steps performed by a savings discovery server in a manner consistent with the principle of the present invention.

FIG. 6 is a flow chart of the operations performed by server 400. At step 600, the buyer (or buyer's agent) logs on to savings discovery server 400 via network interface 445, creates buyer's request 201 via buyer interface 510. The buyer can then disconnect from the server/network while the request is being processed and later reconnect to receive a response. Buyer request 201 is generally composed of information such as origin and destination addresses; other travel itinerary details such as dates, times, connect points, lodging address/amenities/class, rental car type/amenities; prices for air, lodging, and rental car; and proximity tolerances for the origin and destination addresses. Buyer's request 201 is also stored in buyer's request datastore 425 for subsequent access/marketing analysis.

At steps 610 and 620, savings business logic processor 405 calls upon the services of geocoding processor 415 to attach geocodes (for example, latitude and longitude or similar information identifying location) to the origin and destination addresses. Savings business logic processor 405 calls upon the services of proximity search processor 420, in conjunction with component supplier system interface 410, to communicate with supplier interface 530 for airports and lodgings within the proximity tolerances specified in the buyer's request 201. Further, savings business logic processor 405 uses search constraint relaxation processor 435 to "relax" constraints of the buyer's request 201, such as the lodging amenities constraint, and test whether this relaxation will lower the total travel cost, such as price of the lodging travel component in this example.

At step 630, savings business logic processor 405 checks the air itinerary of buyer request 201 for a connecting routing. If present, the connecting itinerary is split into two separate origin and destination segments.

At step 640, savings business logic processor 405 searches traders' datastore 430 for pre-packaged opportunities 645 that meet the requirements of buyer's request 201.

At step 650, savings business logic processor 405 checks the price and availability of the components of the requested itinerary and all alternative travel components and re-configured itineraries generated by steps 610, 620, 630, and 640. Any that are not available are removed from further consideration. The availability and price request is illustrated in FIG. 5 as the arrow 103 from savings discovery server 400 to supplier interface 530. The response to availability/price request 103 is illustrated in FIG. 5 as the arrow 150 from supplier interface 530 to savings discovery server 400.

At step 660, savings business logic processor 405 determines the lowest price of all components that have been identified and are available at this point. These lowest prices are formatted as price-to-beat messages 105 and sent to trader interface 520 and supplier interface 530 via component supplier system interface 410 and network interface 445. Traders and suppliers 655 conduct analysis to determine if they want to respond with prices equal to or less than the price conveyed in price-to-beat messages 105. If they wish to respond, traders and suppliers 655 format just-in-time offerings 301 and send them to savings business logic processor 405 via network interface 445 and component supplier system interface 410.

At step 670, savings business logic processor 405 re-prices the re-configured travel options, taking into consideration all alternative airports, routings, lodgings, pre-packaged tours, and just-in-time offerings.

Figure 7:
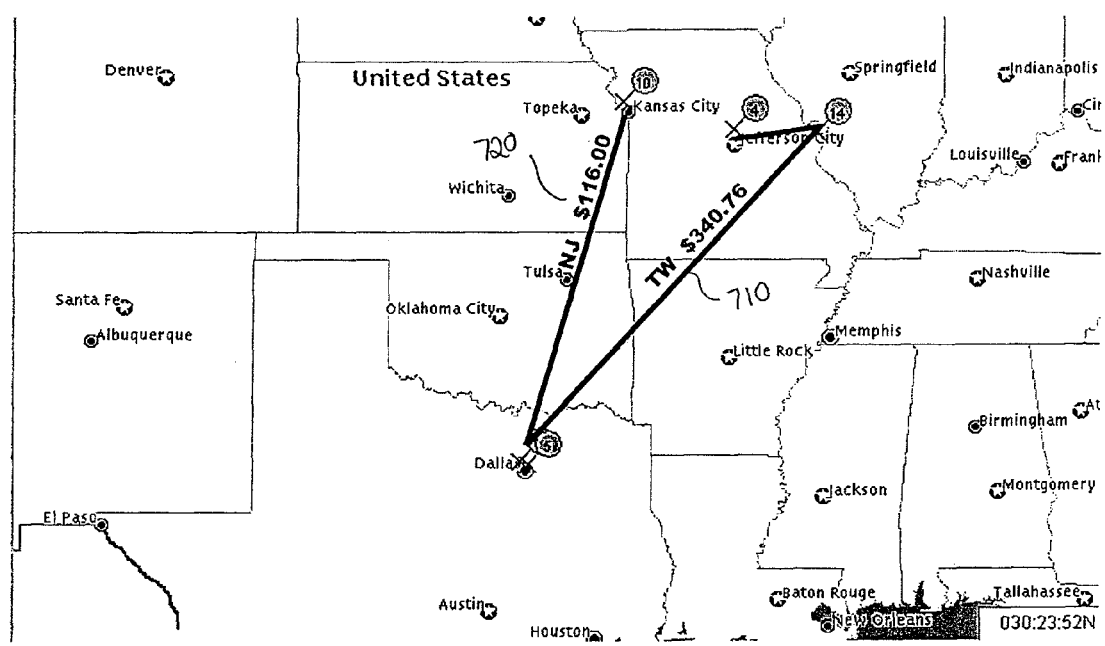
FIG. 7 is an exemplary map showing an alternative travel itinerary offering a non-obvious saving associated with a buyer's request.

At step 680, savings business logic processor 405 identifies and sorts the repriced travel options that are lower than the original price conveyed in buyer request 201. Those not lower are deleted in step 690. Those travel options that are lower are presented to the buyer in step 685 as savings response 101 via buyer interface 510 and network interface 445. Savings business logic processor 405 uses mapping processor 440 to portray savings response 101 geographically on a map. Such a map enables the buyer to select from the low-cost alternatives by visualizing the differences. For example, how significant is an alternative flight plan (including, for example, flying in and out of different airports and at different times) or the location of an alternative hotel (staying at a hotel inside or outside a destination city). FIG. 7 illustrates an example of a map produced by mapping processor 440. Travel routes 710 and 720 show two alternative routes along with their respective prices. In this example, a buyer requesting an itinerary from Jefferson City to Dallas could save $224.76 by driving to Kansas City.

The following is a example of the report available to the buyer that demonstrates the "non-obvious savings" offered by a system configured in accordance with the present invention.

| Option | Source | Air | Hotel | Car | Total | Savings |
|---|---|---|---|---|---|---|
| 1 | Package 1 | 533.0 | 236.0 | 150.0 | 919.0 | 181.0 |
| 2 | Package 2 | 533.0 | 248.0 | 150.0 | 931.0 | 169.0 |
| 3 | Package 3 | 533.0 | 254.0 | 150.0 | 937.0 | 163.0 |
| 4 | Alto&D/ Alt Lodging | 340.76 | 178.0 | 100.0 | 618.76 | 481.24 |
| 5 | Alt O&D Alt Lodging | 340.76 | 178.0 | 100.0 | 618.76 | 481.24 |
| 6 | Alt O&D/ Alt Lodging | 340.76 | 178.0 | 100.0 | 618.76 | 481.24 |
| 7 | Alt O&D/ Alt Lodging | 317.0 | 178.0 | 100.0 | 595.0 | 505.0 |

CONCLUSION

As explained, systems consistent with the present invention permit a buyer, seasoned or occasional, to systematically discover and take advantage of non-obvious savings just as if he or she had the services of a seasoned buyer or buyer agent by his side. Systems consistent with the present invention can be pre-programmed with nonobvious pricing knowledge and automatically apply this knowledge to search for nonobvious savings. Such systems conduct this search by performing non-obvious re-configurations of goods and services and/or checking the prices of non-obvious suppliers of pre-packaged goods and services. They go a step further than even the seasoned buyer or buyer agent by requesting just-in-time "best offer" price quotes from suppliers, thereby creating a type of online, last-minute auction.

For example systems consistent with the present invention provide information on low cost travel alternatives by presenting consumers with options for selecting alternate airports when originating or arriving at an alternate airport can save money, For example, travelers flying in and out of Jefferson City, Mo. can save money by driving 130 miles to Kansas City, Mo. Another travel alternative presented may be alternate lodging. Sometimes travelers can save money by picking an alternate hotel; systems consistent with the present invention find lower-priced (but similar) accommodations within 1 or 2 miles of a traveler's original planned hotel or appointment. Travel packages offer another source of low cost travel alternatives. Travelers needing air, car, and lodging can sometimes qualify for existing prepackaged deals available in such sources as the SABER Tour guide offered by The SABER Group, Inc. Additionally, splitting tickets may offer cost savings in travel. For example a traveler can save money by converting a ticket with a connecting itinerary into two tickets, each having one segment of the original itinerary. To illustrate further, the H fare from Jefferson City, Mo. to San Francisco might be sold out, but still available for Jefferson City, Mo. to St. Louis and St. Louis to San Francisco.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method for providing information regarding savings associated with travel alternatives comprising the steps, performed by a processor, of:

receiving a request from a user specifying a travel itinerary that includes a selected originating location and a selected destination location, wherein the request includes information identifying the selected originating and destination locations, and proximity tolerances specifying a user's acceptable distance range of at least one of the selected originating location or selected destination location for searching for alternative itineraries;

analyzing the travel itinerary specified in the request, including the selected originating and destination locations, to determine a set of alternative itineraries different than the travel itinerary specified in the request, wherein the analyzing step includes identifying at least one alternative itinerary including an alternate originating location or destination location that is within the proximity tolerances and different than the selected originating location or destination location of the travel itinerary specified in the request;

determining a value for the travel itinerary specified in the request;

determining a value for of the alternative itineraries; and generating a report, based on the analysis and determination, including a value for each alternative itinerary reflecting a savings in travel costs in comparison with the travel itinerary reflected by the request.

2. The method of claim 1, wherein the report includes the travel itinerary specified in the request, each of the alternative itineraries, the value for each travel itinerary, and the savings in travel costs is based on a difference between the value for the travel itinerary specified in the request and each of the alternative itineraries.

3. The method of claim 1, wherein the analyzing step includes locating any alternate lodging that is within the proximity tolerances.

4. The method of claim 1, wherein the receiving step includes assigning geographical coordinates for each of the originating location and the destination.

5. The method of claim 4, wherein the analyzing step includes generating a set of locations with coordinates located within a predetermined range of the destination based on information from a geographical coordinates database.

6. The method of claim 5, wherein the step of generating a set of locations includes reducing the range when a number of locations in the set exceeds a predetermined number.

7. The method of claim 5, wherein the step of generating a set of locations includes increasing the range when a number of locations in the set is smaller than a predetermined number.

8. A method for providing information regarding savings associated with travel alternatives comprising the steps, performed by a processor, of:

receiving a request from a user specifying a travel itinerary that includes a selected originating location and a selected destination location;

analyzing the travel itinerary specified in the request, including the selected originating and destination locations, to determine a set of alternative itineraries different than the travel itinerary specified in the request;

determining a value for the travel itinerary specified in the request;

determining a value for each of the alternative itineraries; and generating a report reflecting the analysis and determinations, wherein the analyzing step includes identifying at least one alternative itinerary including an alternate originating location or destination location that is different than the selected originating location or destination location of the travel itinerary specified in the request, wherein the analyzing step includes locating any predetermined travel packages that include travel for the travel itinerary reflected in the request, and any predetermined travel packages that includes travel for the at least one alternative itinerary, and whereinthe travel packages are preconfigured packages based upon prior negotiations with providers of travel services.

9. A method for providing information regarding savings associated with travel alternatives comprising the steps, performed by a processor, of:

receiving a request from a user specifying a travel itinerary that includes a selected originating location and a selected destination location;

analyzing the travel itinerary specified in the request, including the selected originating and destination locations, to determine a set of alternative itineraries different than the travel itinerary specified in the request;

determining a value for the travel itinerary specified in the request;

determining a value for each of the alternative itineraries;

generating a report reflecting the analysis and determinations;

sending at least one price-to-beat request to a plurality of service providers reflecting information an the travel itinerary with a value associated with the determined value for the travel itinerary specified in the request and the determined value for each of the alternative itineraries;

receiving a response from each of the service providers with information on a service provider travel itinerary and a value of the service provider travel itinerary, wherein the travel itinerary from each of the service providers may be the same or comparable, according to each respective service provider, to the user's travel itinerary or one of the alternative itineraries;

reconfiguring the value of the travel itinerary specified in the request and the values for each of the alternative itineraries based on the responses from each of the service providers; and providing a report based on the analysis, determination and reconfiguration including an indication of the reconfigured values of the travel itinerary and the alternative itineraries.

10. The method of claim 9, wherein the report includes the travel itinerary specified in the request, each of the alternative itineranes, and a difference between the reconfigured value for the travel itinerary specified in the request and each of the alternative itineraries.

11. The method of claim 9, wherein the report is produced geographically on a map, wherein the map includes the travel itinerary specified in the request, at least one of the alternative itineraries and the reconfigured value for each travel itinerary included in the map.

12. A computer-readable medium containing instructions for causing a computer to perform a method for providing information regarding savings associated with travel alternatives the method comprising the steps of:

receiving a request from a user specifying a travel itinerary that includes a selected originating location and a selected destination location, wherein the request includes information identifying the selected originating and destination locations, and proximity tolerances specifying a user's acceptable distance range of at least one of the selected originating location or selected destination location for searching for alternative itineraries;

analyzing the travel itinerary specified in the request including the selected originating and destination locations, to determine a set of alternative itineraries different than the travel itinerary specified in the request, wherein the analyzing step includes identifying at least one alternative itinerary including an alternate originating location or destination location that is within the proximity tolerances and different than the selected originating location or destination location of the travel itinerary specified in the request;

determining a value for the travel itinerary specified in the request; determining a value for each of the alternative itineraries; and generating a report, based on the analysis and determination, including a value for each alternative itinerary reflecting a savings in travel costs in comparison with the travel itinerary reflected by the request.

13. The computer-readable medium of claim 12, wherein the report includes the travel itinerary specified in the request, each of the alternative itineraries, the value for each travel itinerary, and the savings in travel costs is based on a difference between the value for the travel itinerary reflected by the request and each of the alternative itineraries.

14. The computer-readable medium of claim 12, wherein the analyzing step includes locating any alternate lodging that is within the proximity tolerances.

15. The computer-readable medium of claim 12, wherein the receiving step includes assigning geographical coordinates for each of the originating location and the destination.

16. The computer-readable medium of claim 15, wherein the analyzing step includes generating a set of locations with coordinates located within a predetermined range of the destination based on information from a geographical coordinates database.

17. The computer-readable medium of claim 16, wherein the step of generating a set of locations includes reducing the range when a number of locations in the set exceeds a predetermined number.

18. The computer-readable medium of claim 16, wherein the step of generating a set of locations includes increasing the range when a number of locations in the set is smaller than a predetermined number.

19. A computer-readable medium containing instructions for causing a computer to perform a method for providing information regarding savings associated with travel alternatives, the method comprising the steps of:

receiving a request from the user specifying a travel itinerary that includes a selected originating location and a selected destination location, wherein the request includes information identifying the selected originating and destination locations, and proximity tolerances specifying a user's acceptable distance range at least one of the selected originating location or selected destination location for searching for alternative itineraries;

analyzing the travel itinerary specified in the request, including the selected originating and destination locations, to determine a set of alternative itineraries different than the travel itinerary specified in the request, wherein the analyzing step includes identifying at least one alternative itinerary including an alternate originating location or destination location that is within the proximity tolerances and different than the selected originating location or destination location of the travel itinerary specified in the request; and determining a value for the travel itinerary specified in the request; determining a value for each of the alternative itineraries; and generating a report reflecting the analysis and determinations.

20. A computer-readable medium containing instructions for causing a computer to perform a method for providing information regarding savings associated with travel alternatives, the method comprising the steps of:

receiving a request from the user specifying a travel itinerary that includes a selected originating location and a selected destination location;

analyzing the travel itinerary specified in the request, including the selected originating and destination locations, to determine a set of alternative itineraries different than the travel itinerary specified in the request;

determining a value for the travel itinerary specified in the request;

determining a value for each of the alternative itineraries;

sending at least one price-to-beat request to a plurality of service providers reflecting information on the travel itinerary with a value associated with the determined value for the travel itinerary specified in the request and the determined value for each of the alternative itineraries;

receiving a response from each of the service providers with information on a service provider travel itinerary and a value of the service provider travel itinerary, wherein the travel itinerary from each of the service providers may be the same or comparable, according to each respective service provider, to the user's travel itinerary or one of the alternative itineraries;

reconfiguring the values of the travel itinerary specified in the request and the values for each of the alternative itineraries based on the responses from each of the service providers; and providing a report including an indication of the reconfigured values of the travel itinerary and the alternative itineraries.

21. The computer-readable medium of claim 20, wherein the report includes the travel itinerary specified in the request, each of the alternative itineraries, and a difference between the reconfigured value for the travel itinerary specified in the request and each of the alternative itineraries.

22. The computer-readable medium of claim 20, wherein the report is produced geographically on a map, wherein the map includes the travel itinerary specified in the request, at least one of the alternative itineraries and the reconfigured value for each travel itinerary included in the map.

23. A computer system for providing information regarding savings associated with travel alternatives comprising:

a buyer interface for producing a request from a user specifying a travel itinerary that includes a selected originating location and a selected destination location, wherein the request includes information identifying the selected originating and destination locations, and proximity tolerances specifying a user's acceptable distance range of at least one of the selected originating location or selected destination location for searching for alternative itineraries; and a server for analyzing the travel itinerary specified in the request, including the selected originating and destination locations, to determine a set of alternative itineraries different than the travel itinerary specified in the request, for determining a value for the travel itinerary specified in the request, for determining a value for each of the alternative itineraries, and for generating a report, based on the analysis and determination, including a value for each alternative itinerary reflecting a savings in travel costs in comparison with the travel itinerary reflected by the request, wherein analyzing the travel itinerary includes identifying at least one alternative itinerary including an alternate originating location or destination location that is within the proximity tolerances and different than the selected originating location or destination location of the travel itinerary specified in the request.

24. The computer system of claim 23, wherein the report includes the travel itinerary specified in the request, each of the alternative itineraries, the value for each travel itinerary, and the savings in travel costs is based on a difference between the value for the travel itinerary specified in the request and each of the alternative itineraries.

25. The computer system of claim 23, wherein analyzing the travel itinerary includes locating any alternate lodging that is within the proximity tolerances.

26. The computer system of claim 23, wherein the buyer interface assigns geographical coordinates for each of the originating location and the destination.

27. The computer system of claim 26, wherein analyzing the travel itinerary includes generating a set of locations with coordindtes located within a predetermined range of the destination based on information from a geographical coordinates database.

28. The computer system of claim 27, wherein generating a set of locations includes reducing the range when a number of locations in the set exceeds a predetermined number.

29. The computer system of claim 27, wherein generating a set of locations includes increasing the range when a number of locations in the set is smaller than a predetermined number.

30. The computer system of claim 23, including a supplier interface for receiving availability price requests from the server and for providing availability price responses from a plurality of service providers with information on service provider travel itineraries and respective values of the service provider travel itineraries, wherein each of the travel itineraries from the supplier interface may be the same or comparable, according to each of the plurality of service providers, to the user's travel itinerary or one of the alternative itineraries.

31. A computer system for providing information regarding savings associated with travel alternatives comprising:

a buyer interface for producing a request from a user specifying a travel itinerary that includes a selected originating location and a selected destination location; and a server for analyzing the travel itinerary specified in the request, including the selected originating and destination locations, to determine a set of alternative itineraries different than the travel itinerary specified in the request, for determining a value for the travel itinerary specified in the request, for determining a value for each of the alternative itineraries, and for generating a report reflecting the analysis and determinations, wherein the analyzing step includes identifying at least one alternative itinerary including an alternate originating location or destination location that is different than the selected originating location or destination location of the travel itinerary specified in the request, and wherein analyzing the travel itinerary includes locating any predetermined travel packages that include travel for the travel itinerary reflected in the request, and any predetermined travel packages that include travel for the at least one alternative itinerary, and wherein the travel packages are pre-configured packages based on prior negotiations with providers of travel resources.

32. A computer system for providing information regarding savings associated with travel alternatives comprising:

a buyer interface for producing a request from a user specifying a travel itinerary that includes a selected originating location and a selected destination location;

a server for analyzing the travel itinerary specified in the request, including the selected originating and destination locations, to determine a set of alternative itineraries different than the travel itinerary specified in the request, for determining a value for the travel itinerary specified in the request and for determining a value for each of the alternative itineraries; and a trader interface for receiving price-to-beat requests from the server and for providing a response from a trader with information on a trader travel itinerary and a value of the trader travel itinerary, wherein the travel itinerary from the trader interface may be the same or comparable, according to the trader, to the user's travel itinerary or one of the alternative itineraries wherein the server is configured to reconfigure the value of the travel itinerary specified in the request and the values for each of the alternative itineraries based on the response from the trader and generate a report including an indication of the reconfigured values of the travel itinerary and the alternative itineraries.

33. A computer system for providing information regarding savings associated with travel alternatives comprising:

a buyer interface for producing a request from a user specifying a travel itinerary that includes a selected originating location and a selected destination location;

a server for analyzing the travel itinerary specified in the request, including the selected originating and destination locations, to determine a set of alternative itineraries different than the travel itinerary specified in the request, for determining a value for the travel itinerary specified in the request and for determining a value for each of the alternative itineraries; and a supplier interface for receiving price-to-beat requests from the server and for providing responses from a plurality of service providers with information on service provider travel itineraries and respective values of the service provider travel itineraries, wherein each of the travel itineraries from the supplier interface may be the same or comparable, according to each of the plurality of service providers, to the user's travel itinerary or one of the alternative itineraries wherein the server is configured to reconfigure the value of the travel itinerary specified in the request and the values for each of the alternative itineraries based on the responses from the service providers and generate a report including an indication of the reconfigured values of the travel itinerary and the alternative itineraries.

34. The computer system of claim 33, wherein the report includes the travel itinerary specified in the request, each of the alternative itineraries, and a difference between the reconfigured value for the travel itinerary specified in the request and each of the alternative itineraries.

35. The computer system of claim 33, wherein the report is produced geographically on a map, wherein the map includes the travel itinerary specified in the request, at least one of the alternative itineraries and the reconfigdred value for each travel itinerary included in the map.

36. A computer system for providing information regarding savings associated with travel alternatives comprising:
   an interface means for producing a request from a user specifying a travel itinerary that includes a selected originating location and a selected destination location, wherein the request includes information identifying the selected originating and destination locations, and proximity tolerances specifying a user's acceptable distance range of at least one of the selected originating location or selected destination location for searching for alternative itineraries; and
   a serving means for analyzing the travel itinerary specified in the request, including the selected originating and destination locations, to determine a set of alternative itineraries different than the travel itinerary specified in the request, for determining a value for the travel itinerary specified in the request, for determining a value for each of the alternative itineraries, and for generating a report, based on the analysis and determination, including a value for each alternative itinerary reflecting a savings in travel costs in comparison with the travel itinerary reflected by the request,
   wherein analyzing the travel itinerary includes identifying at least one alternative itinerary including an alternate originating location or destination location that is within the proximity tolerances and different than the selected originating location or destination location of the travel itinerary specified in the request.

37. A method for providing information regarding savings associated travel alternatives comprising the steps, performed by a processor, of:
   receiving a request from a user specifying a travel itinerary that includes a selected originating location and a selected destination location, wherein the request includes information identifying the selected originating and destination locations, and proximity tolerances specifying a user's acceptable distance range of at least one of the selected originating location or selected destination location for searching for alternative itineraries;
   analyzing the travel itinerary specified in the request, including the selected originating and destination locations, to determine a set of alternative itineraries different than the travel itinerary specified in the request, wherein the analyzing step includes identifying at least one alternative itinerary including an alternate originating location or destination location that is within the proximity tolerances and different than the selected originating location or destination location of the travel itinerary specified in the request;
   determining a value for the travel itinerary specified in the request;
   determining a value for each of the alternative itineraries; and
   generating a report reflecting the analysis and determinations.

38. A method for providing travel alternatives, comprising:
   receiving, from a user, a request specifying a travel itinerary that includes a selected origination location and a selected destination location, a first value associated with the itinerary, and proximity tolerances specifying a user's acceptable distance range of at least one of the selected originating location or selected destination location for searching for alternate itineraries;
   determining, without user intervention, a set of alternate itineraries different than the travel itinerary specified in the request, at least one alternate itinerary being associated with an alternative value and a route between an alternate originating location or alternate destination location that is within the proximity tolerances, and either the origination or destination location of the travel itinerary specified in the request; and
   providing a report including a indication of the first value, the altenate value for each alternate itinerary, and a savings value for each alternate itinerary reflecting a difference between the first value and the respective alternate value.

39. The method of claim 38, wherein the first value reflects a cost of travel between the origination and destination locations.

40. The method of claim 39, wherein the first value further includes a cost of lodging.

41. The method of claim 38, wherein the set of alternate itineraries includes at least one alternate itinerary that is associated with a pre-configured travel package based on prior negotiations with at least one provider of travel resources.

42. The method of claim 38, wherein each alternate value is equal to or less than the first value.

43. A method for providing travel alternatives, comprising:
   receiving, from a user, a request specifying a travel itinerary that includes a selected origination location and a selected destination location, a first value associated with the itinerary, and proximity tolerances specifying a user's acceptable distance range of at least one of the selected originating location or selected destination location for searching for alternative itineraries;
   determining, without user intervention, a set of alternative itineraries different than the itinerary specified in the request, at least one alternative itinerary including a route between an alternate origination location or alternate destination location that is within the proximity tolerances, and either the selected origination or destination location of the travel itinerary specified in the request;
   determining an alternate value for each alternative itinerary; and providing a report including a geographical map that contains:
   a graphical representation of the origination location, destination location, and each alternate location,
   a graphical representation of a first path between the origination and destination locations and a corresponding cost of travel for the first path, and
   a graphical representation of an alternate path between each alternate location and either the origination or destination locations and a corresponding cost of travel for each respective alternate path.

44. A method for providing travel alternatives, comprising:
   receiving, from a user, a request specifying a travel itinerary that includes a travel route between a selected origination location and selected destination location, and proximity tolerances specifying a user's acceptable distance range of at least one of the selected originating location or selected destination location for searching for alternative itineraries;

determining, without user intervention, a set of alternative itineraries different than the itinerary specified in the request, at least one alternative itinerary including an alternate route between an alternate origination location or alternate destination location that is within the proximity tolerances, and either the origination or destination location of the travel itinerary specified in the request; and providing a report to the user such that the user may visually inspect a map including a graphical representation of the route between the origination and destination locations and the alternate routes, and a travel cost for each corresponding route.

45. The method of claim 44, wherein the travel cost for each route is presented adjacent to the graphical representation of the respective route on the map.

* * * * *

UNITED STATES PATENT AND TRADEMARK OFFICE
CERTIFICATE OF CORRECTION

| | | |
|---|---|---|
| PATENT NO. | : 7,742,934 B2 | Page 1 of 1 |
| APPLICATION NO. | : 09/275887 | |
| DATED | : June 22, 2010 | |
| INVENTOR(S) | : Offutt, Jr. et al. | |

It is certified that error appears in the above-identified patent and that said Letters Patent is hereby corrected as shown below:

Column 10,

Line 20, "whereinthe" should read --wherein the--;

Line 40, "an" should read --on--;

Line 63, "itineranes" should read --itineraries--.

Column 11,

Line 67, "range at" should read --range of at--.

Column 12,

Line 21, "trayel" should read --travel--.

Column 13,

Line 36, "coordindtes" should read --coordinates--.

Column 15,

Line 9, "reconfigdred" should read --reconfigured--.

Column 16,

Line 18, "altenate" should read --alternate--.

Signed and Sealed this

Eighth Day of February, 2011

David J. Kappos
*Director of the United States Patent and Trademark Office*